United States Patent [19]
Johnson

[11] Patent Number: 5,339,676
[45] Date of Patent: Aug. 23, 1994

[54] WATER LEAK DETECTION, COLLECTION AND SUPPORT DEVICE

[76] Inventor: Del Johnson, 2532 Hambersham, Albany, Ga. 31705

[21] Appl. No.: 71,456

[22] Filed: Jun. 2, 1993

[51] Int. Cl.$^5$ .............................................. G01M 3/04
[52] U.S. Cl. ................................... 73/40; 73/863.52; 141/86; 184/106; 220/571
[58] Field of Search .............. 73/40, 863.52, 863.51; 141/86, 88; 184/106; 220/571

[56] References Cited

U.S. PATENT DOCUMENTS

| | | |
|---|---|---|
| 396,619 | 1/1889 | Smith . |
| 828,896 | 8/1906 | Muir ................................ 184/106 |
| 1,017,455 | 2/1912 | Otto . |
| 1,276,079 | 8/1918 | Kovnat ............................ 184/106 |
| 1,334,088 | 3/1920 | Goldstone ....................... 184/106 |
| 2,446,361 | 8/1948 | Clibbon . |
| 3,353,615 | 11/1967 | Nekimken . |
| 3,662,912 | 5/1972 | Calle ..................................... 220/9 |
| 3,854,885 | 12/1974 | Fromm et al. ..................... 23/254 |
| 4,013,105 | 3/1977 | Uuskallio ............................ 141/86 |
| 4,049,121 | 9/1977 | White ................................. 206/439 |
| 4,054,184 | 10/1977 | Marcinko .......................... 184/1.5 |
| 4,392,552 | 7/1983 | Partridge .......................... 184/106 |
| 4,930,602 | 6/1990 | Gust .................................. 184/106 |
| 5,069,878 | 12/1991 | Ehrenkranz ................. 73/863.52 X |

Primary Examiner—Hezron E. Williams
Assistant Examiner—Joseph W. Roskos
Attorney, Agent, or Firm—Hopkins & Thomas

[57] ABSTRACT

A water leak detection, collection and support device comprising a tray, a grid, a collection receptacle and an indicator. The device is particularly suited to detect and collect small, previously undetectable water leaks. The device may either be permanently mounted under a sink or it may be freestanding.

7 Claims, 1 Drawing Sheet

WATER LEAK DETECTION, COLLECTION AND SUPPORT DEVICE

FIELD OF INVENTION

The invention generally relates to the field of devices that are used to detect and collect the leakage of water from plumbing pipes. More specifically, the invention described herein is drawn to a detection, collection, and support device, that is able to detect water leakage, even in very minute amounts, collect the leaking water, and also act as a storage shelf.

BACKGROUND OF THE INVENTION

Virtually every household in the United States has one or more sinks that is mounted into a cabinet type arrangement. Typically, the sink drains into a pipe arrangement that is housed below the sink and within the interior of the cabinet. The piping normally acts as a conduit to allow water to pass from the sink through the cabinet's interior and out through the cabinet and/or house wall. Unfortunately, the standard U-shaped piping systems that are found below most modern kitchen and bathroom sinks frequently leak. Although a homeowner might think that leaks occur at the point where the pipe goes through the cabinet or house wall, in fact, most water leaks either occur at the point at which the sink connects to the pipe, or at the joints of the piping itself. Sometimes the amount of water leakage is so small that it is virtually impossible for the homeowner to detect. However, even a small minuscule amount of water leakage will cause water damage to cabinet and/or house walls and floors. In addition, minute water leaks will not only directly cause water damage, but in regions in which termites prevail, the water damaged areas are particularly susceptible to termites.

Heretofore, a device for detecting and collecting water or other liquids that leaks from sink piping, regardless of the rate or amount of leakage, has been unknown. Moreover, the inventor is not aware of any means whatsoever that is able to detect the existence of extremely minute amounts of water leakage, and collect the leaking water in a detectable and reusable collection means.

However, various oil and coolant drain pan systems exist. Although none of these references teach or suggest the collection and detection of water leaks, U.S. Pat. Nos. 4,930,602 to Gust, 4,392,552 to Partridge, and 4,054,184 to Marcinko teach oil collecting pans that may temporarily drain oil into a disposable bottle or bag that is sealed and discarded.

It is therefore an object of the present invention to provide a water leak detection device that is able to detect and collect leaking water and act as a support upon which household items may be placed.

It is also an object of the present invention to provide an inexpensive device that obviates the need for expensive plumbing repairs to repair minor and/or undetectable water leaks.

It is a further object of the present invention to provide a means for collecting the leaking water that when nearly full can be readily and easily removed, emptied, and repositioned to again collect leaking water.

It is an additional object of the present invention to provide an inexpensive means for detecting water leaks that is also able to prevent the occurrence of water damage that is associated with leaking water.

SUMMARY OF THE INVENTION

The present invention generally comprises a water detection, collection and support device that comprises a tray having a bottom, with a drain opening, a grid that is placed on top of the bottom tray, a collection means that is connected to the drain opening and an indicator means inside of the collection means. In a preferred embodiment, the tray is generally defined by four side walls—a backside wall, a front side wall, and two end side walls—and a bottom that slopes downwardly towards the drain opening. The back side wall of the tray has a plurality of openings through which bolts, screws or other means for attachment may be inserted to connect the tray to a house wall or to the inside of a cabinet. Preferably, the back side wall of the tray is higher than the front side wall and is connected therebetween by two end side walls that slope downwardly from the back side wall towards the front side wall so that a user of the device may readily and more easily place and remove items on top of the grid.

In an alternative embodiment, the end side walls of the tray may have a plurality of holes such that via a bolt, screw or other means for connection, the end side walls may be connected to a means for support such that the device is free standing inside of a cabinet.

The grid of the present invention is placed inside of and supported by the tray bottom. The individual rectangular chambers comprising the grid act to prevent the splattering of water which might occur when water flows or drips into the device. In addition, the top surface of the grid may also act as a support shelf upon which items, such as, for example, household supplies, may be placed.

The collection means is connected to the tray bottom's drain opening and may be virtually of any shape as long as there is sufficient room to position the device with the collection means connected thereto below the sink and its pipes. Preferably, the bottom of the collection means will be flat, or slanted downwardly towards its center point, such that when the indicator means is inside of the collection means any water that enters the collection means will come in contact with the indicator means.

The indicator means of the present invention is placed inside of the collection means, preferably on top of the bottom surface of the interior of the collection means. The indicator means, however, may also be suspended inside of the collection means, if desired. The indicator means may comprise a dry powder substance that is water soluble such that when it comes in contact with water, it will solubilize and indicate the presence of water. Preferably, the dry powder type of an indicator means will change color after it comes in contact with water. In an alternative embodiment, the indicator means may be a cellulosic type material, such as, for example, paper, which rests on the inside of the collection means bottom surface and covers the entirety of the bottom surface. In this embodiment, it is also preferable that the cellulosic type indicator means will change colors when it comes in contact with water.

When the homeowner has installed the invention described herein below the pipes of a sink, and the indicator means indicates that there is a water leak, the homeowner can either attempt to fix the leak, or, if the leak is relatively minor, the homeowner can allow water to leak into the collection means of the device until the collection means is full. The homeowner can then simply disconnect the collection means from the tray, empty the contents of the collection means, and then reconnect the collection means to the device such that the collection means will resume collecting water. The collection means can be reattached to the tray bottom's drain opening with or without the presence of an indicator means. A particularly useful aspect of the present invention is that if the leak is relatively minor, the user or homeowner may allow the collection means to become substantially full and then simply remove the collection means and discard its contents and replace it back on to the drain opening. This is particularly useful because often times fixing and repairing the leak is expensive and in some events virtually impossible. The present invention is therefore a cheap and inexpensive means to avoid costly plumbing expenses and at the same Lime, prevent water damage to cabinetry and other woodworking which, if left unchecked, would lead to water damage, and possibly termite damage.

DETAILED DESCRIPTION

Figure 1:
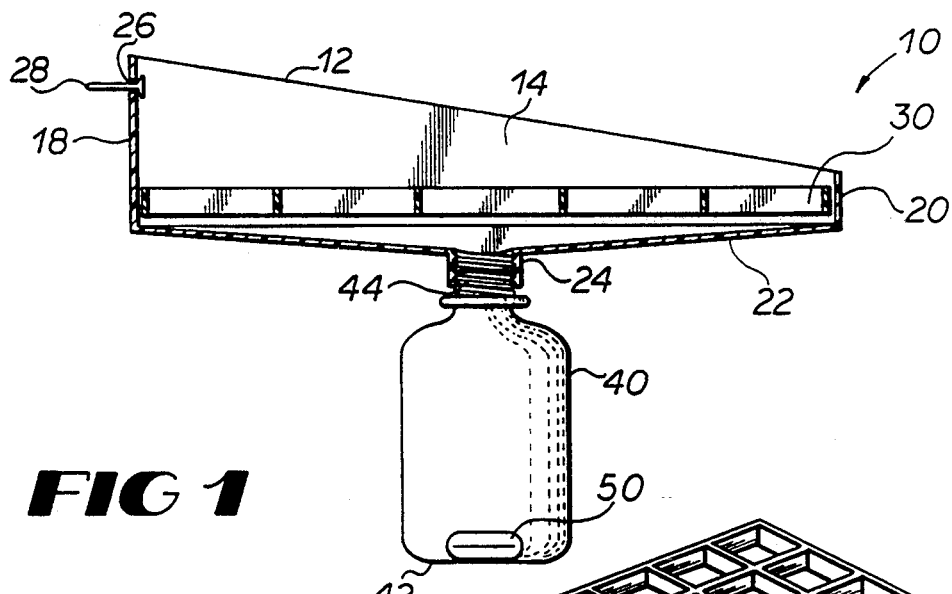
FIG. 1 is a side view of an embodiment of the water leak detection, collection and support device.

The present invention generally comprises a tray, a grid, a collection means and an indicator means that is uniquely and particularly adapted for use in detecting, collecting and controlling water leaks. As shown in FIG. 1, the water leak detection and storage device 10, comprises tray 12, grid 30, collection means 40 and indicator means 50.

Figure 2:
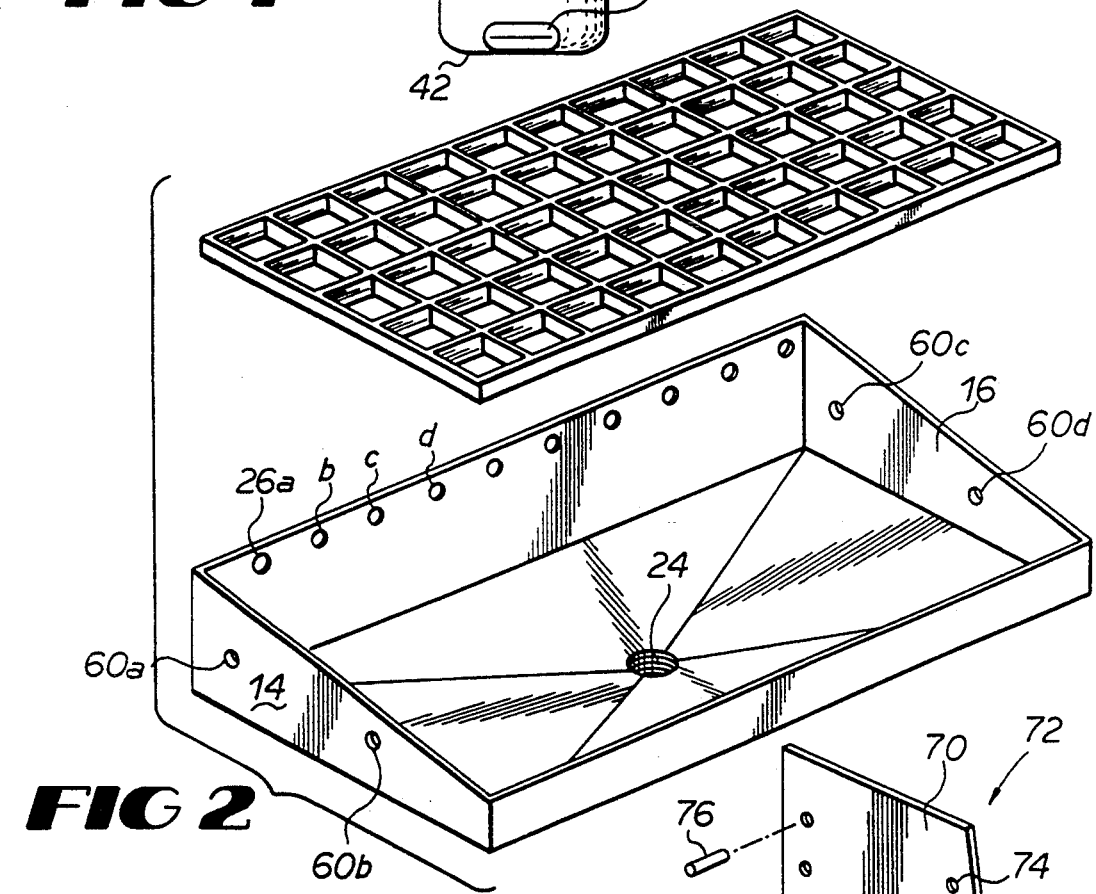
FIG. 2 is an exploded perspective view of an embodiment of the water leak detection, collection and support device.
Figure 3:
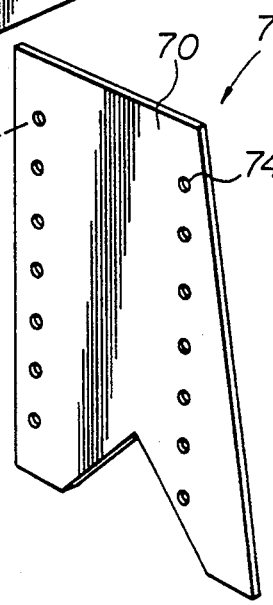
FIG. 3 is a perspective view of an embodiment of a means for supporting the water leak detection, collection and support device.

More specifically, tray 12 comprises back side wall 18, end side walls 14 and 16, front side wall 20 and bottom 22. As best shown in FIGS. 1 and 2, end side walls 14 and 16 have a sloping top surface that slopes downwardly from back side wall 18 to front side wall 20. Rear end wall 18, as best shown in FIG. 2, may have a plurality of openings 26 through which screws 28(a) and 28(b) may connect tray 12 to a house wall or cabinet wall (not shown). Front end wall 20, as best shown in FIG. 1, is substantially lower in height than rear wall 18 because such an arrangement allows for the user of the device to more easily access the top surface of grid 30 such that items may be placed thereupon and removed. Bottom wall 22, as best shown in FIG. 1, generally slopes downwardly towards drain opening 24. Such an arrangement, due to gravity forces, guides any water that has fallen into tray 12 towards drain opening 24 and into collection means 40.

Grid 30, as shown in FIG. 1, rests inside of tray 12 and in particular, oil top of tray 22. As shown, the grid 30 rests inside of tray bottom 22 such that the top surface of grid 30 is substantially horizontal. As such, grid 30 may act as a storage, or support shelf for items. As shown in FIG. 2, grid 30 comprises a plurality of rectangles 32, which act to prevent water from splashing. Grid 30 also allows leaking water to pass therethrough and keeps any items which are on top of grid 30 from coming in contact with water that is in tray 12.

Collection means 40 generally has a flat bottom surface 42 and a opening 44. In a preferred embodiment, as shown in FIG. 1, opening 44 should be threaded such that it may reciprocally engage drain opening 24. This type of collection means is particularly useful because it is able to collect water for a period of time until substantially full, at which time it may then be emptied and replaced such that it can collect more water. The collection means further acts as a housing for the indicator means 50.

Indicator means 50 may be a water soluble powder substance that, when exposed to water, will change colors. Indicator means 50 may be in a capsule form or it may be disbursed on top of a cellulosic material. Preferably, the indicator means should cover as much of the bottom surface 42 of the collection means 40 as possible. It will be appreciated that in the event of a more substantial leak which the user or homeowner does intend to repair, the indicator means need not be replaced after collection means 40 has been emptied and reconnected to tray 12.

In an alternative embodiment, legs 70 and 72 (not shown) may be attached to end side walls 14 and 16, respectively. In this embodiment, two pairs of openings 60a and 60b, and 60c and 60d must be made in end side walls 14 and 16. Legs 70 and 72, which comprise a plurality of openings 74, may then be connected to end side walls 14 and 16 by pins 76. Plurality of openings 74 allow tray 12 to be positioned at different distances from the bottom of a pipe. And, in this embodiment, the device 10 is free-standing and as such, it may be temporarily positioned below a pipe, rather than more permanently connecting it to a house or cabinet wall.

To use the present invention, the tray 12 should either be connected to the house cabinet wall with screws 28, or legs 70 and V2 should be connected to end side walls 14 and 16 as described above. Tray 12 should be positioned, for example, inside a cabinet below the pipes which extend from the sink. A suitable indicator means 50 should then be placed inside of collection means 40 and collection means 40, via its opening 44 should be connected to tray bottom drain opening 24. The leakage detection and storage device is now in position to detect water leaks and to support the storage of items.

The invention has been described in detail with particular reference to the preferred embodiment. It will be understood that variations and modifications can be effected within the spirit and scope of the invention as defined by the claims appended hereto.

I claim:

1. A water leak detection, collection and support device comprising
    (a) a tray having a bottom for receiving water;
    (b) a grid placed on top of said tray bottom for preventing water splash and for supporting items;
    (c) a drain opening in said tray bottom;
    (d) a collection means having a bottom and connected to said drain opening for collecting water; and
    (e) an indicator means on said bottom of said collection means for indicating the presence of water in said collection means.

2. The water leak detection and support device of claim 1, wherein said tray bottom is sloped downwardly towards said drain opening.

3. The water leak detection and support device of claim 1, wherein said collection means is a bottle.

4. The water leak detection and support device of claim 1, wherein said indicator means is water soluble.

5. The water leak detection and support device of claim 1, wherein said indicator means changes color when it contacts water.

6. A water leak detection, collection and support device comprising:
   (a) a tray having a bottom sloped downwardly for receiving water;
   (b) a grid comprising a plurality of rectangles placed on top of said tray bottom for preventing water splash and for supporting items;
   (c) a drain opening having threads in said tray bottom;
   (d) a removable collection means having a bottom and an opening with threads wherein said threads may be connected to said drain opening threads, for collecting water and for discarding collected water such that said collection means may be reconnected to said drain opening; and
   (e) a water soluble indicator means inside of said collection means that changes color when said indicator means comes in contact with water such that it thereby indicates the presence of water inside of said collection means.

7. A method for detecting leakage of water from a water pipe comprising:
   (a) installing a water leak detection device comprising
      (i) a tray having a bottom for receiving water;
      (ii) a grid placed on top of said bottom for preventing water splash and for supporting items;
      (iii) a drain opening in said tray bottom;
      (iv) a collection means having a bottom connected to said drain opening for collecting water; and
      (v) an indicator means inside of said collection means for indicating the presence of water in said collection means; and
   (b) checking said indicator means inside of said collection means to determine if leakage has occurred.

* * * * *